(12) United States Patent
Swenson

(10) Patent No.: US 8,801,991 B2
(45) Date of Patent: Aug. 12, 2014

(54) HEAT-SEAL FAILURE PREVENTION METHOD AND ARTICLE

(75) Inventor: Paul M. Swenson, South Hamilton, MA (US)

(73) Assignee: Kortec, Inc., Rowley, MA (US)

( * ) Notice: Subject to any disclaimer, the term of this patent is extended or adjusted under 35 U.S.C. 154(b) by 24 days.

(21) Appl. No.: 13/303,758

(22) Filed: Nov. 23, 2011

(65) Prior Publication Data

US 2012/0135171 A1    May 31, 2012

Related U.S. Application Data

(60) Provisional application No. 61/416,903, filed on Nov. 24, 2010.

(51) Int. Cl.
*B29C 45/16* (2006.01)

(52) U.S. Cl.
USPC ........................................ 264/255; 264/328.8

(58) Field of Classification Search
CPC .................. B29C 45/0053; B29C 45/1642
USPC ............................................... 264/255, 328.8
See application file for complete search history.

(56) References Cited

U.S. PATENT DOCUMENTS

| | | | |
|---|---|---|---|
| 2,418,856 A | 4/1947 | Stacey | |
| 3,339,240 A | 9/1967 | Corbett | |
| 3,679,119 A | 7/1972 | Copping | |
| 3,944,124 A | 3/1976 | Hexel | |
| 4,174,413 A | 11/1979 | Yasuike et al. | |
| 4,554,190 A | 11/1985 | McHenry et al. | |
| 4,568,261 A | 2/1986 | McHenry et al. | |
| 4,751,035 A * | 6/1988 | McHenry et al. | ............. 264/255 |
| 4,946,365 A | 8/1990 | Kudert et al. | |
| 4,990,301 A | 2/1991 | Krishnakumar et al. | |
| 5,433,910 A | 7/1995 | Mukai et al. | |

(Continued)

FOREIGN PATENT DOCUMENTS

| | | |
|---|---|---|
| EP | 0419829 | 4/1998 |
| JP | 05084787 | 4/1993 |

(Continued)

OTHER PUBLICATIONS

F.A. Eigl et al., "Mehr Verständnis für den Kern," Kunststoffe 46-50 (Carl Hanser Verlag, Munich) (Jan. 1, 1998) (German), translated as F.A. Eigl et al., "A Better Understanding of the Core," 88:1 Kunststoffe 14-16 (Jan. 1, 1998).

(Continued)

*Primary Examiner* — Jill Heitbrink
(74) *Attorney, Agent, or Firm* — McCarter & English, LLP

(57) ABSTRACT

A co-injected molded multi-layer article has inner and outer layers, an interior layer contained within the inner and outer layers and a surface portion to which a closure or other component may be heat-sealed. The article is molded by co-injecting the inner, outer and interior layer materials into a mold cavity of a mold. The interior layer material is caused to flow along a steam line offset from the zero velocity gradient of the combined material flow and biased toward a material flow for forming an outer wall of the multi-layer article. The resultant molded multi-layer article contains an interior layer located in a heat sealable region that avoids a breach or failure during a heat seal operation to seal an opening of the molded article.

14 Claims, 8 Drawing Sheets

(56) References Cited

U.S. PATENT DOCUMENTS

| | | | |
|---|---|---|---|
| 5,914,138 A | 6/1999 | Swenson | |
| 6,063,325 A * | 5/2000 | Nahill et al. | 264/328.8 |
| 6,180,042 B1 | 1/2001 | Takeuchi et al. | |
| 6,787,097 B1 | 9/2004 | Homann et al. | |
| 6,908,581 B2 | 6/2005 | Sabin et al. | |
| 2002/0192404 A1 | 12/2002 | Swenson | |
| 2003/0124209 A1* | 7/2003 | Swenson | 425/130 |
| 2004/0265422 A1 | 12/2004 | Sabin et al. | |
| 2009/0152280 A1 | 6/2009 | Luburic | |
| 2009/0285929 A1 | 11/2009 | Diamantakos et al. | |
| 2010/0044916 A1 | 2/2010 | Richards et al. | |
| 2011/0217496 A1 | 9/2011 | Swenson | |

FOREIGN PATENT DOCUMENTS

| | | |
|---|---|---|
| JP | 06190860 | 7/1994 |
| JP | 6278164 A | 10/1994 |
| WO | WO03/064133 | 8/2003 |
| WO | WO2005018909 | 3/2005 |
| WO | WO2007006163 | 1/2007 |
| WO | WO2011112613 | 9/2011 |

OTHER PUBLICATIONS

International Search Report and Written Opinion of the International Searching Authority for International Application No. PCT/US2011/062017, mailed Feb. 16, 2012.

Naitove, Matthew H., "Multi-Layer Injection Molded Tubs Take on Thermoforming & Metal Cans," Plastics Technology, May 2011, (2 pages), available at http://www.ptonline.com/articles/multi-layer-injection-molded-tubs-take-on-thermoforming-metal-cans.

International Search Report and Written Opinion of the International Searching Authority for International Application No. PCT/US2011/027594, mailed Sep. 29, 2012.

International Search Report and Written Opinion of the International Searching Authority for PCT/US2012/061057, dated Feb. 12, 2013, (17 pages).

* cited by examiner

HEAT-SEAL FAILURE PREVENTION METHOD AND ARTICLE

CROSS-REFERENCE TO RELATED APPLICATION

This application claims the benefit of U.S. Provisional Patent Application No. 61/416,903 filed Nov. 24, 2010, the disclosure of which is incorporated herein by reference in its entirety.

FIELD OF THE INVENTION

The present invention relates to multi-layer injection molded articles. In particular, embodiments relate to multi-layer molded plastic articles suitable for sealing with a heat sealing mechanism without damaging a barrier or scavenger component embedded in the article.

BACKGROUND

Injection molded articles are used for a variety of purposes. Plastic injection molded articles are commonly made from materials such as Polyethylene Terephtholate (PET) or Polypropylene (PP). In many applications, an injection-molded container has a lid or closure heat-sealed to an open portion of the container. Often, the container has a flange, lip or other protuberance at the open end of the container against which the closure is sealed. Commonly, the closure comprises a first layer configured to enclose the container and a plastic layer coating at least a portion of the first layer that contacts the container. In many applications, the first layer contains a foil, e.g., aluminum foil, or another material that provides a gas and/or water barrier for the container opening. The plastic layer is typically the same (or similar) material as the container that is capable of forming a heat-seal with the container material. The plastic material of the container and the closure in the area where the container and plastic layer contact is then heated (by various known heating methods), often with compression, which sufficiently softens and/or melts the plastic layer and/or adjacent plastic container material to seal the lid to the container. The heat-seal process results in a heat-affected zone in the container material adjacent to the heat-seal, e.g., about 10% of the thickness of the flange.

Plastic materials such as PET and PP are gas (e.g., oxygen, nitrogen, etc.) permeable. For applications in which gas permeability is undesirable, for example, food products, medicines and products that degrade upon gaseous exposure, a barrier material or scavenger material is co-injected with the plastic material. Typically, the barrier material, such as Ethyl Vinyl Alcohol (EVOH), is injected at the interior of the PET or PP material stream, forming an EVOH interior layer embedded within an inner and outer layer of PET or PP.

This co-injection process has previously been limited to articles that are essentially symmetrical in shape due to process limitations with respect to forming the barrier layer. In addition, in order to provide an interior layer that sufficiently extends through the molded article to prevent undesirable gas permeation, the interior layer material is injected into the mold in such a manner so that it flows throughout essentially the entire mold.

However, injecting the interior layer material in this manner can cause the interior layer material to flow beyond the desired interior location. For example, the interior layer material can penetrate or breakthrough the flow front or leading edge of the inner and outer layer material. If the interior layer penetrates into the heat-affected zone of the heat-seal, delamination can occur, leading to heat-seal failure. Presently known solutions attempt to more precisely control the flow of the interior layer material, e.g., by controlling injection pressure, temperature, timing, injection location, etc., so that the interior layer flows sufficiently throughout the mold cavity without flowing beyond the desired interior layer locations. Nonetheless, remaining systemic and process variations still result in interior layer material flowing into the heat-affected zone.

Accordingly, there is a need for methods and apparatuses for forming injection molding articles having an interior layer where the interior layer material does not detrimentally extend or impinge into the heat-seal affected zone. There is further a need for co-injection molded articles containing such an interior layer, but in which the interior layer material does not detrimentally extend or impinge into the heat-seal affected zone.

SUMMARY OF THE INVENTION

Exemplary methods and systems are taught herein to form a multi-layer molded article with an embedded barrier layer or scavenger layer that remains intact and functional after a heat seal process to seal an opening in the multi-layer molded article. Exemplary multi-layer molded articles with an embedded barrier layer or scavenger layer that remain intact and functional after a heat seal process to seal an opening in the multi-layer molded article are taught herein. In some exemplary embodiments the heat sealable zone of the exemplary multi-layer molded articles is located in a rim or flange portion extending circumferentially about an open end of the multi-layer molded articles.

In some embodiments, exemplary co-injection molding apparatuses include a mold that defines a mold cavity for co-injection/extrusion forming a multi-layer molded article having an inner layer, an outer layer and an interior layer embedded within the inner and outer layers (i.e., skin) and a surface in a heat-sealable portion to which a closure or other component may be heat-sealed thereto. The interior layer may be a first polymeric material. The inner and outer layers may be a second polymeric material. The interior layer may be substantially gas-impermeable relative to the permeability of the second polymeric material. The interior layer may be substantially gas-scavengable relative to the permeability of the second polymeric material. The molding apparatus is configured to simultaneously inject the inner layer polymeric material, the outer layer polymeric material and the interior layer polymeric material into the mold cavity to form the resulting multi-layered molded article. The molding apparatus is further configured to inject the interior layer polymeric material into the mold cavity along a flow line offset from the zero velocity gradient(s) of the combined material flow. The combined material flow is formed from the inner polymeric material flow, the interior polymeric material flow and the outer polymeric material flow. The molding apparatus is further configured to inject the interior polymeric material to the side of the zero velocity gradient that is opposite or away from the heat-sealable surface portion. During the heat sealing operation up to 10% or more of the thickness of the heat sealable portion of the multi-layered molded article melts, yet the interior polymeric material remains intact and functional as a barrier layer or a scavenger layer in the multi-layered molded article.

In other embodiments, exemplary methods for forming a multi-layer molded article with a heat sealable zone are taught. The exemplary methods inject the interior layer polymeric material to the side of the zero velocity gradient of a combined material flow that is opposite or away from the heat-seal surface of a heat-sealable portion of the resulting multi-layer molded article. The interior layer polymeric material forms a barrier layer or a scavenger layer in the resulting multi-layer molded article. The barrier layer or the scavenger layer is embedded in a skin formed from the inner and outer polymeric material. The exemplary methods form the resulting multi-layer molded article with a heat sealable portion to which a closure or other component may be heat-sealed. The exemplary methods direct a leading edge of the interior polymeric material into the heat sealable portion and subsequently position the leading edge of the interior polymeric material in the heat sealable portion to avoid failure of the inner layer in the sealable portion during a heat sealing operation. During the heat sealing operation up to 10% or more of the thickness of the heat sealable portion of the multi-layered molded article melts, yet the interior polymeric material remains intact and functional as a barrier layer or a scavenger layer in the multi-layered molded article.

In other embodiments, exemplary methods for forming a multi-layer molded article with a heat sealable zone are taught. The exemplary methods inject the interior layer polymeric material to the side of the zero velocity gradient of a combined material flow that is opposite or away from the heat-seal surface of a heat-sealable portion of the resulting multi-layer molded article. The interior layer polymeric material forms a barrier layer or a scavenger layer in the resulting multi-layer molded article. The barrier layer or the scavenger layer is embedded in a skin formed from the inner and outer polymeric material. The exemplary methods form the resulting multi-layer molded article with a heat sealable portion to which a closure or other component may be heat-sealed. The exemplary methods direct a leading edge of the interior polymeric material into the heat sealable portion and subsequently position the leading edge of the interior polymeric material in the heat sealable portion to avoid failure of a heat seal of the resulting multi-layer article during a heat sealing operation. During the heat sealing operation up to 10% or more of the thickness of the heat sealable portion of the multi-layered molded article melts, yet the interior polymeric material remains intact and functional as a barrier layer or a scavenger layer in the multi-layered molded article.

In some embodiments, a co-molded article has an inner layer, an outer layer and an interior layer substantially contained within the inner and outer layers and heat sealable portion with a surface portion to which a closure or other component may be heat-sealed. The interior layer may be of a material different than and/or have different compositions from the inner and outer layer. The interior layer may include materials and/or compositions exhibiting increased gas-impermeability or gas-scavengability relative to the inner and outer layer material. The interior layer is positioned in the heat sealable portion in a manner that avoids barrier layer failure or scavenger layer failure due to a heat sealing operation. A component (e.g., a lid or a seal) may be heat-sealed to the surface portion of the co-molded article, forming an intact heat-seal between the component and the surface portion. During the heat sealing operation up to 10% or more of the thickness of the heat sealable portion of the multi-layered molded article melts, yet the interior polymeric material remains intact and functional as a barrier layer or a scavenger layer in the multi-layered molded article.

In some embodiments, computer readable mediums holding computer executable instructions are taught. Execution of the instructions by a processor controls formation of a co-molded multi-layer article as taught herein. Execution of the instructions causes injection of an interior layer polymeric material to the side of the zero velocity gradient of a combined material flow that is opposite or away from a heat-sealable surface portion of a resulting multi-layer molded article. The interior layer polymeric material forms a barrier layer or a scavenger layer in the resulting multi-layer molded article. The barrier layer or the scavenger layer is embedded in a skin formed from the inner and outer polymeric material. The exemplary instructions when executed form the resulting multi-layer molded article with a heat sealable portion to which a closure or other component may be heat-sealed. Execution of the exemplary instructions direct a leading edge of the interior polymeric material into the heat sealable portion and subsequently position the leading edge of the interior polymeric material in the heat sealable portion to avoid failure of the inner layer in the sealable portion during a heat sealing operation. During the heat sealing operation up to 10% or more of the thickness of the heat sealable portion of the multi-layered molded article melts, yet the interior polymeric material remains intact and functional as a barrier layer or a scavenger layer in the multi-layered molded article. The heat sealing operation may affix a closure or other component to the multi-layered molded article.

Other objects and advantages of the exemplary embodiments will become apparent in view of the following detailed description of the embodiments and the accompanying drawings.

DETAILED DESCRIPTION

Disclosed herein are exemplary co-injection molding apparatuses, multi-layer molded articles and containers, and methods to form and control a barrier layer or the scavenger layer in a multi-layer molding process to ensure the integrity of the barrier layer or the scavenger layer and/or a heat seal zone during and after the implementation of a heat seal process to seal an opening in the multi-layer molded article or container. By ensuring the integrity of the barrier layer or the scavenger layer and/or the heat seal zone, the container is created such that the barrier layer or the scavenger layer and/or the heat seal zone is fully intact with no breaches or weakened areas, and thus the shelf life of the container is extended. The integrity of the heat seal in the heat seal zone is ensured by restricting the barrier layer or the scavenger layer from contacting a heat sealable surface of the heat seal zone or becoming positioned in an area close to the surface of the heat seal zone through which it may become exposed during the heat seal process. This allows a lid or seal to be fully secured to the container at the heat seal zone. Should the barrier layer or the scavenger layer breach the heat sealable surface, before, during or after a heat seal process then a proper seal would not form between a lid or seal and the heat sealable surface, causing the shelf life of the container to decrease. Likewise, the integrity of the barrier layer or the scavenger layer is maintained by positioning the barrier layer or the scavenger layer in the heat seal zone that does not cause the barrier layer or the scavenger layer to melt, breach or perforate during a heat seal process.

Figure 1:
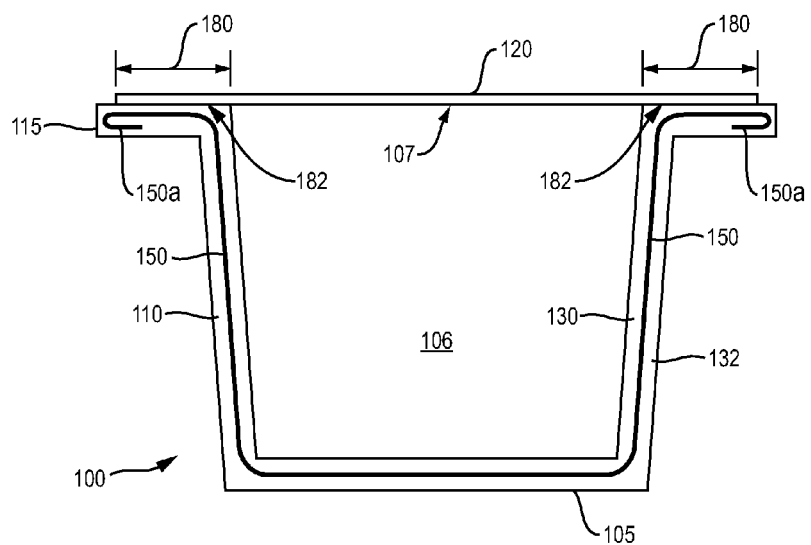
FIG. 1 is a schematic cross-sectional view of a container according to an embodiment of the invention, but with the wall thickness of the container exaggerated for illustrative purposes.

Referring to FIG. 1, a container 100 has a bottom 105, a sidewall 110 extending from the periphery of the bottom 105 to form a chamber 106, which is generally cup-shaped or U-shaped in this embodiment, having an open end 107, and a flange 115 extending from the periphery of the sidewall 110 at the open end 107 of the container. A closure 120, which may be of the conventional type, may be heat-sealed to the flange 115 by conventional heat sealing methods. The container 100 includes a heat sealable zone 180 with a heat seal surface 182. In this embodiment, the heat sealable zone 180 extends circumferentially about the open end 107. Likewise, in this embodiment the heat seal surface 182 extends circumferentially about the open end 107. In this embodiment the heat sealable zone 180 and the heat seal surface 182 are formed in the flange 115. Though the illustrative embodiment has a cup-like shape, other exemplary embodiments contemplate containers having any shape or configuration in which a heat-seal is used to seal a portion of the container.

The container 100 may be formed by injecting a first plastic material, such as, for example, Ethylene Vinyl Alcohol (EVOH), and a second plastic material, such as, for example, Polyethylene (PE) or Polypropylene (PP) into a mold cavity configured so as to form an inner layer 130, an interior layer 150 and an outer layer 132 generally conforming to the desired end shape of the container or article, accounting for manufacturing requirements (e.g., thermal expansion/contraction) as is known. Though PE, PP and EVOH are commonly used materials, it should be understood that other suitable materials may be used, and that the invention applies using other materials. In some embodiments, either PE or PP is used to form the inner and outer layers of the resulting multi-layer article and EVOH is used to form the interior layer of the resulting multi-layer article.

As can be seen in FIG. 1, the interior layer 150 extends substantially throughout the entirety of the container 100, but is fully surrounded by or embedded between the inner layer 130 and the outer layer 132. The interior layer 150 can be a gas barrier material, such as EVOH or other suitable materials that are known or may become known, that sufficiently prevents gases, for example, oxygen, from permeating through the container, i.e., from the outside to the inside and vice versa. The interior layer 150 can be a gas scavenger material that sufficiently scavenges gases, for example, oxygen. As can be seen in the particular embodiment of FIG. 1, the interior layer 150 extends into the flange 115.

Exemplary embodiments position and cause a leading edge of the polymeric material forming the interior layer 150 to fold over or wrap around toward the outer layer 132 within the heat-sealable zone 180. The fold over portion 150a of the interior layer 150 assures that the interior layer 150 will be encapsulated within inner and outer layers, 130 and 132 respectively, while extending substantially into the heat-sealable zone, 180, fully around the perimeter of the container. Any gaps where the interior layer does not extend into heat-sealable zone may allow excess gas permeation into the sealed container, which is undesirable as it can shorten the shelf life of the contents held in a resulting container. During a heat sealing operation up to 10% or more of the thickness of the material in the heat-sealable zone 180 melts to form a gas impermeable bond between the closure and the container.

Absent the fold over portion 150a biased toward the outer layer 132 during the heat sealing operation, the interior layer 150 at or just below the heat-sealable surface 182 may affect the sealing between the closure and the container because the adhesion between the first polymeric material and the closure material may not be as good as between the second polymeric material and the closure material. Further, absent the fold over portion 150a biased toward the outer layer 132 or the inner layer 130, the interior layer 150 does not extend into the complete perimeter of the heat-sealable zone 180 and therefore, part of the sealable portion of the container surface is not covered by barrier material, thus allowing excessive permeation of $O_2$ into the container contents sealed therein. For example, if as little as 1%-2% of the part surface area does not have interior layer coverage, the shelf life of the goods sealed within the container can be shortened due to the high permeation rate through the outer layer 132. The fold over portion 150a advantageously assures that interior layer 150 extends into the complete perimeter of the heat sealable zone 180 and completely around the perimeter of the part.

Beneficially, the interior layer 150 via the fold over portion 150a extends into the heat sealable zone 180 and is properly distanced from the heat sealable surface 182. Consequently, should the interior layer 150 be positioned just below the heat sealable surface 182 then the adhesion between the heat seal closure and the container flange is considered poor, weak or does not occur. Poor or weak adhesion detrimentally allows $O_2$ permeation between the heat seal closure and the container.

Proper positioning of the fold over portion 150a in or into the heat sealable zone 180 can be advantageously performed in accordance with the teachings herein. Should the interior layer 150 breach the inner layer 130 of the container 100 at the heat sealable surface 182 then it is likely that water absorbed by some barrier materials (for example, EVOH) would decrease the barrier property of the material and reduce the shelf life of the container. Further, if the interior layer 150 were to breach the inner layer 130 of the container 100 at the heat sealable surface 182 then it is likely that the interior layer 150 would contact and adhere to the heat sealable surface 182. If this were to occur, the heat seal closure may not fully adhere to the heat sealable surface 182 due to the contamination caused by the interior layer 150 and reduce the shelf life of the container.

The interior layer 150 may be created by simultaneously injecting a first polymeric material forming the interior layer 150 with a second polymeric material forming the inner layer 130 and the outer layer 132. Such methods are generally known, such as described in U.S. Pat. No. 6,908,581 and the documents incorporated therein, also incorporated by reference herein.

Figure 2:
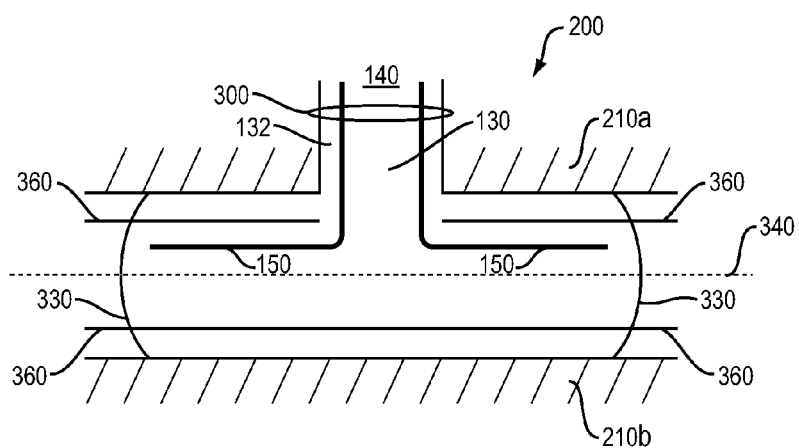
FIG. 2 is schematic cross-sectional view of a mold cavity according to an embodiment of the invention.

As shown schematically in FIG. 2, a mold 200 has mold portions 210a, 210b that form a mold cavity 220 therebetween. A combined annular flow 300 from a nozzle assembly is injected into the mold cavity 220 through an injection gate at gate injection location 140, and the combined annular flow 300 flows from the injection location 140 through the mold cavity 220. The combined annular flow 300 is formed in the nozzle assembly. The nozzle assembly forms the combined annular flow 300 from the first polymeric material for the interior layer 150 and from the second polymeric material for the inner layer 130 and the outer layer 132. The second polymeric material forms an inner annular flow and an outer annular flow while the first polymeric material forms an interior annular flow positioned between the inner annular flow and the outer annular flow of the combined annular flow 300. The flow of the combined annular flow 300 forms a flow front 330 that moves through the mold cavity 220.

Figure 3:
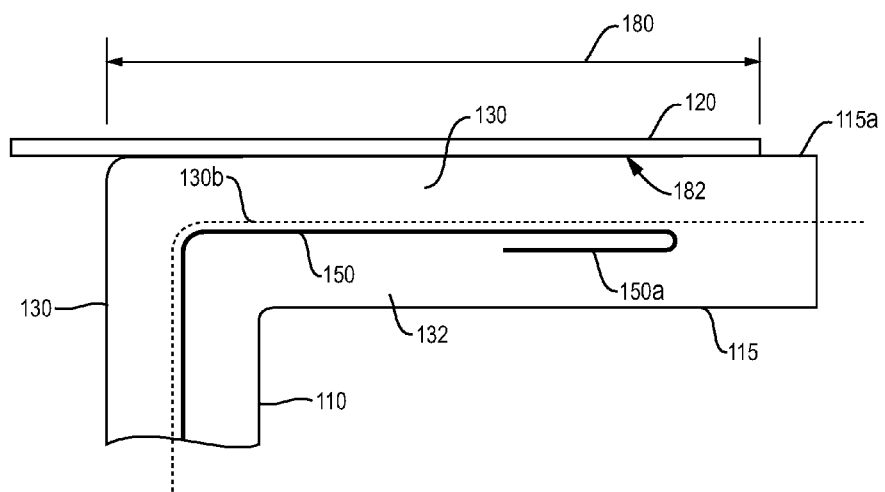
FIG. 3 is an enlarged view of the flange portion shown in FIG. 1.

The volumetric flow volume ratio of the inner flow to the outer flow forming the combined annular flow 300 is selected to cause the interior layer flow stream to flow along a flow line offset from the zero velocity gradient 340 (Vmax) of the combined annular flow 300, yet on a flow line having a greater velocity than the average flow velocity (Vave) 360 and biased toward the outer flow. This prevents the interior layer material flow 150 from breaking through the flow front 330. Rather, the positioning and the timing of injecting the leading edge of the first polymeric material beneficially directs, as shown in FIG. 3, the leading edge of the interior layer material flow 150 to enter the flange 115 and, in turn fold over toward the resulting outer layer 132 within the heat-sealable zone 180 to form the fold over portion 150a. Beneficially, the leading edge of the first polymeric material remains behind the flow front 330 and remains encased by the inner and outer flows of the combined annular flow 300. By starting the interior layer material flow 150 offset from the zero velocity gradient, or shifting the interior layer material flow 150 from the zero velocity gradient to a slower moving flow line biased toward the outer flow of the second polymeric material, the first polymeric material has a velocity that is greater that the average velocity. Thus, the first polymeric material of the interior layer can "catch up" to the fountain flow of the combined flow 130 and fold over, creating a barrier or scavenger layer that extends into the flange 115 and avoids failure as a barrier or scavenger during a heat sealing operation to seal the open end 107 of the container 100.

While the techniques of U.S. Pat. No. 6,908,581 prevent the interior layer material from breaking through the flow front 330 and detrimentally flowing onto the heat sealable surface 182, the present inventor has found that heat-seal failure can still occur due to the leading edge of the first polymeric material detrimentally flowing onto or close to the heat sealable surface 182. What the inventor has discovered is that by offsetting the flow path of the first polymeric material of the interior layer 150 toward the side of the outer layer 132 and off of the zero velocity gradient 340, the fold over portion 150a preserves the integrity of the adhesion of the interior layer 150 to the inner and outer layers and preserves the integrity of the adhesion of the closure to the heat-sealable surface 182 of the second polymeric material during and after the heat sealing operation to maintain barrier coverage or scavenger coverage in the container 100.

Figure 4:
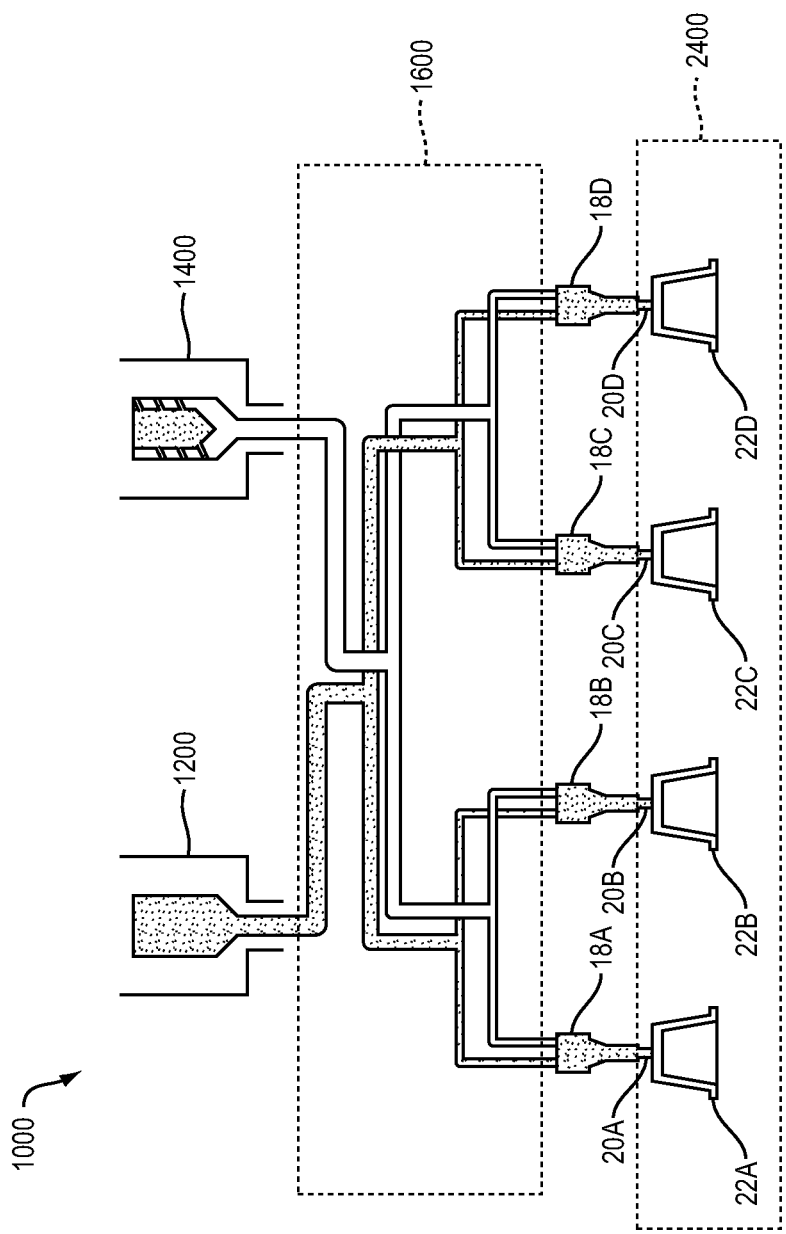
FIG. 4 depicts a cross-sectional view of an exemplary molding system according to various embodiments taught herein.

FIG. 4 illustrates an exemplary system suitable for practicing exemplary embodiments. Co-injection molding system 1000 is configured to inject at least two materials into a mold cavity. Materials suitable for use with the present invention include polymer based materials such as, Polyethylene Terephtholate (PET), Polypropylene (PP), ethylene vinyl alcohol (EVOH), and polycarbonates. Co-injection molding system 1000 includes a first material source 1200, a second material source 1400, and a manifold 1600. Co-injection molding system 1000 further includes nozzle assemblies 18A-18D and mold 2400. Mold 2400 includes gates 20A-20D, and cavities 22A-22D.

A first polymeric material is extruded from the first material source 1200 and a second polymeric material is extruded from the second material source 1400 into the manifold 1600 for combining in nozzles 18A-18D before being injected into mold cavities 22A-22D. The first and second polymeric streams are combined to form an annular combined polymeric stream such that the first polymeric material forms an interior core stream in the combined polymeric stream while the second polymeric material forms the inner and outer streams in the combined stream. The inner and outer streams encase the interior core stream as the annular combined polymeric stream is injected from the nozzle.

Figure 5:
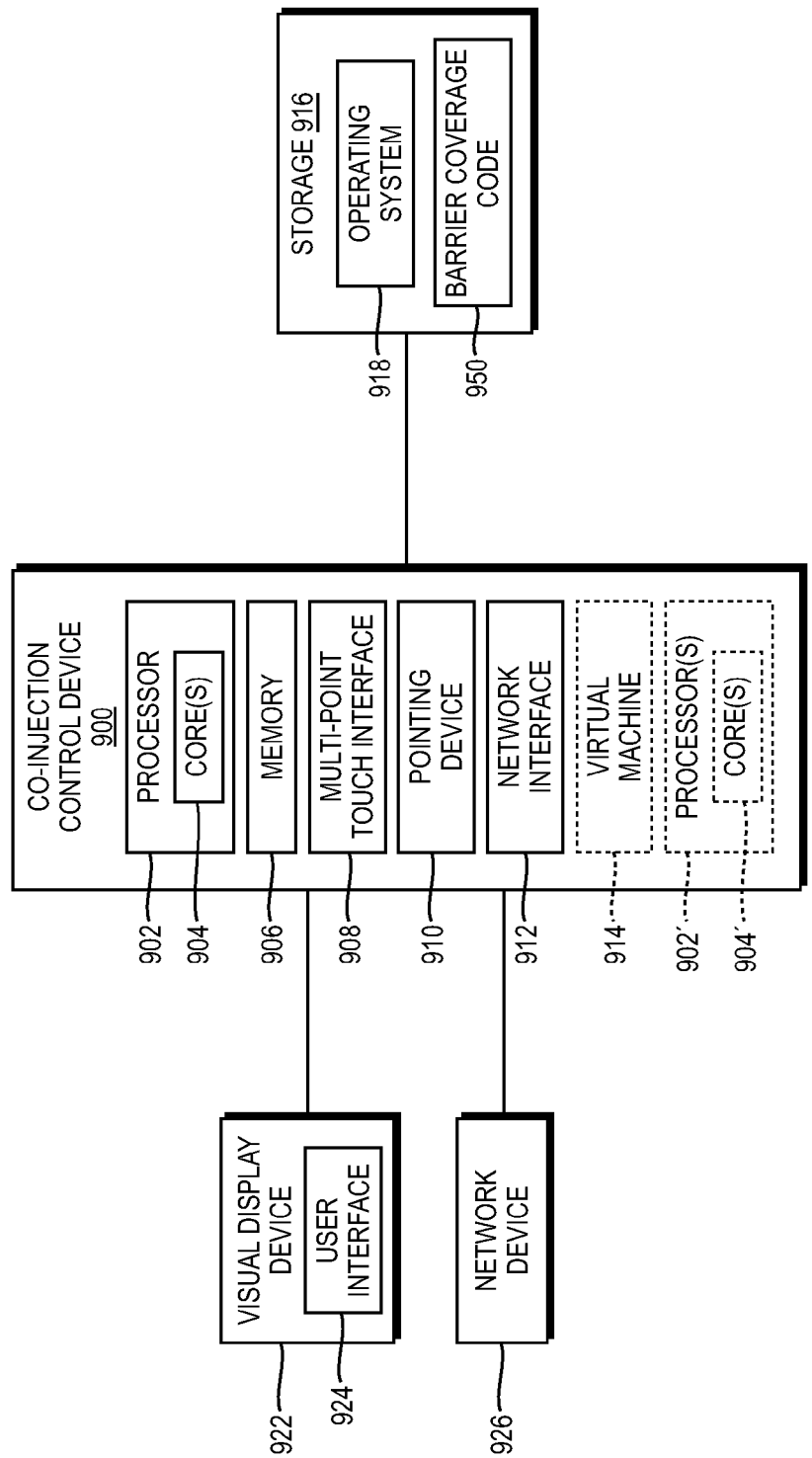
FIG. 5 illustrates an exemplary computing environment suitable for practicing exemplary embodiments taught herein.

FIG. 5 illustrates an exemplary computing environment suitable for practicing exemplary embodiments taught herein. The environment may include a co-injection control device 900 coupled, wired, wirelessly or a hybrid of wired and wirelessly, to co-injection system 1000. The con-injection control device 900 is programmable to implement executable Barrier Protection Code 950 for forming a barrier layer or scavenger layer in a heat sealable portion of a multi-layer molded article that remains intact during and after the heat sealing operation. Co-injection control device 900 includes one or more computer-readable media for storing one or more computer-executable instructions or software for implementing exemplary embodiments. The computer-readable media may include, but are not limited to, one or more types of hardware memory, non-transitory tangible media, etc. For example, memory 906 included in the co-injection control device 900 may store computer-executable instructions or software, e.g., instructions for implementing and processing every module of the executable Barrier Protection Code 950. Co-injection control device 900 also includes processor 902 and, one or more processor(s) 902' for executing software stored in the memory 906, and other programs for controlling system hardware. Processor 902 and processor(s) 902' each can be a single core processor or multiple core (904 and 904') processor.

Virtualization may be employed in co-injection control device 900 so that infrastructure and resources in the computing device can be shared dynamically. Virtualized processors may also be used with the executable Barrier Protection Code 950 and other software in storage 916. A virtual machine 914 may be provided to handle a process running on multiple processors so that the process appears to be using only one computing resource rather than multiple. Multiple virtual machines can also be used with one processor.

Memory 906 may comprise a computer system memory or random access memory, such as DRAM, SRAM, EDO RAM, etc. Memory 906 may comprise other types of memory as well, or combinations thereof.

A user may interact with co-injection control device 900 through a visual display device 922, such as a computer monitor, which may display the user interfaces 924 or any other interface. The visual display device 922 may also display other aspects or elements of exemplary embodiments, e.g. the databases, SPC historical data, etc. Co-injection control device 900 may include other I/O devices such a keyboard or a multi-point touch interface 908 and a pointing device 910, for example a mouse, for receiving input from a user. The keyboard 908 and the pointing device 910 may be connected to the visual display device 922. Co-injection control device 900 may include other suitable conventional I/O peripherals. Co-injection control device 900 may further comprise a storage device 916, such as a hard-drive, CD-ROM, or other non-transitory computer readable media, for storing an operating system 918 and other related software, and for storing executable Barrier Protection Code 950.

Co-injection control device 900 may include a network interface 912 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 912 may comprise a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 900 may be any computer system such as a workstation, desktop computer, server, laptop, handheld computer or other form of computing or telecommunications device that is capable of communication and that has sufficient processor power and memory capacity to perform the operations described herein.

Co-injection control device 900 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Barrier Protection Code 950 includes executable code executable by the processor 902 to control the co-injection system 1000 to selectively control a volumetric flow volume of the inner and outer polymeric streams, control a position of the interior core material stream 150 relative to a flow front of the combined polymeric stream and control extrusion start time of the interior core stream relative to the extrusion start time of the inner and outer polymeric streams as taught herein. That is, Barrier Protection Code 950 includes executable code executable by the processor 902 to control the co-injection system 1000 to place or direct a leading edge of the interior core material flow stream 150 on a flow streamline that has a velocity that is greater that the average velocity of the combined annular flow 300. The Barrier Protection Code 950 includes executable code executable by the processor 902 to control the co-injection system 1000 to place or direct a leading edge of the interior core material flow stream 150 on a flow streamline biased toward the resulting outer layer 132, to place or direct a leading edge of the interior core material flow stream 150 into a downstream heat sealable zone and have the leading edge of the interior core material flow stream 150 to fold over in or near the heat sealable zone to avoid a barrier layer or scavenger layer failure during or after a heat sealing process. The interior core material flow stream 150 folds over toward the resulting outer wall 132. Execution of the Barrier Protection Code 950 by the processor 902 allows the co-injection system 1000 to place the interior layer material flow 150 in a heat sealable zone of the resulting multi-layer plastic article to avoid a breach or failure of the interior layer 150 in the resulting multi-layer molded article during or after a heat sealing operation. Specifically, the Barrier Protection Code 950 of the present invention aims to ensure the integrity of the interior layer 150 and ensure the integrity of the heat sealable surface 182 by restricting the interior layer 150 from contacting and contaminating the heat sealable surface 182, as discussed previously. Methods and co-injection systems taught herein facilitate the co-injection molding of heat-sealable food or beverage containers whereby the interior core stream is located in a heat sealable zone to maintain its integrity during a heat sealing operation.

Figure 6:
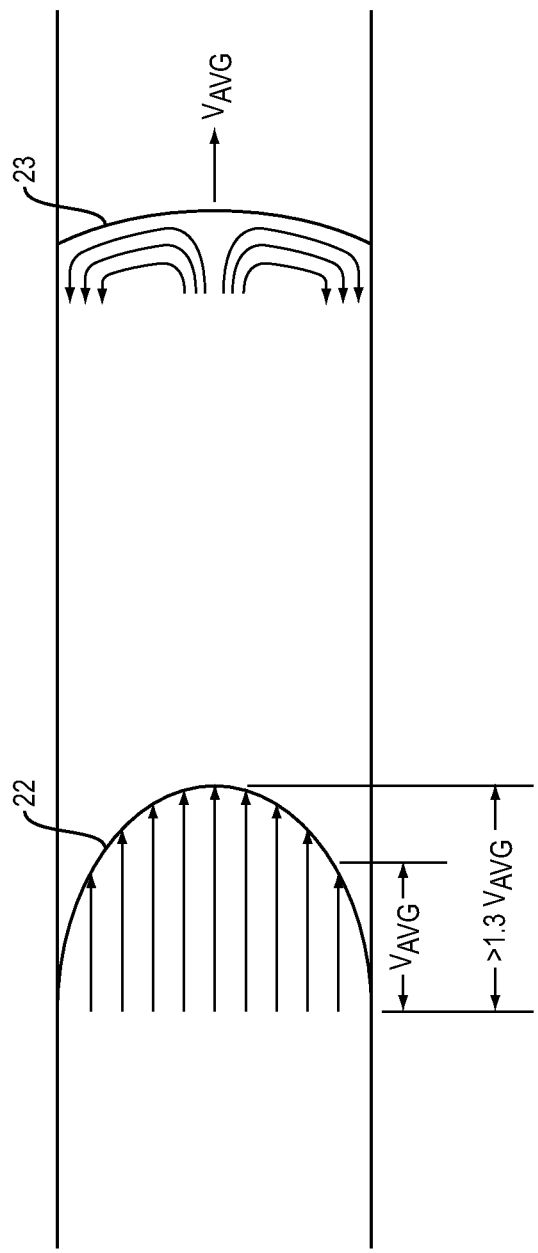
FIG. 6 is a cross-sectional view of the fountain flow effect of a combined polymeric stream as it flows along an annular pathway of a mold cavity.

FIG. 6 depicts the fountain flow effects whereby combined flow has a velocity gradient 22 such that the volumetric flow rate is fastest in the middle and slowest at or near the interface of the combined polymeric stream and the walls of the annular channels of the mold cavity. The flow front of the combined flow 23 shows the fountain flow effect that occurs during polymer flow between cavity walls. The fountain flow of polymers causes the outer surfaces of a molded part to be comprised of material that had flowed along the zero-gradient of the flow upstream of the flow front. If the interior layer flows along the zero-gradient of the combined flow, it will "fountain flow" onto the inner or outer surface of the molded part if it reaches the flow front of the combined polymer flow before the flow front reaches the end of the mold cavity.

Figure 7A:
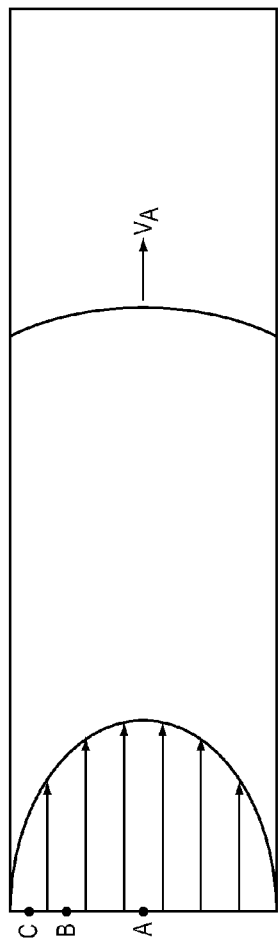
FIGS. 7A and 7B are cross-sectional views of the velocity profile of the combined annular flow of the polymeric stream and the relative velocity differences across the flow gradient of the combined polymeric stream.
Figure 7B:
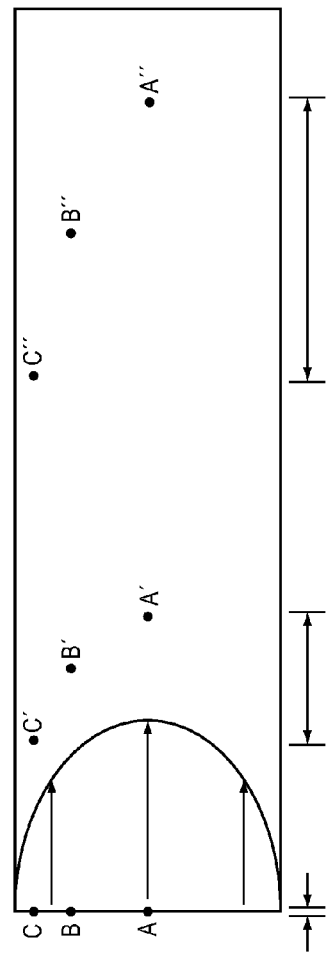

FIGS. 7A and 7B depicts the velocity gradient, where the combined stream is fastest at point "A" and slower at point "C". The zero-velocity gradient occurs at the point where the velocity of the flow is greatest. Because the flow at the zero-velocity gradient streamline is greater than the average velocity of the flow-front, the interior material injected at the zero velocity gradient point can, under some circumstances "catch up" to and pass the flow-front and break through the skin, even if injection of the interior material begins after injection of the inner and outer layers (PET or PP). The interior core stream material will breakthrough when the interior material reaches the flow-front of the zero-velocity gradient.

Figure 7C:
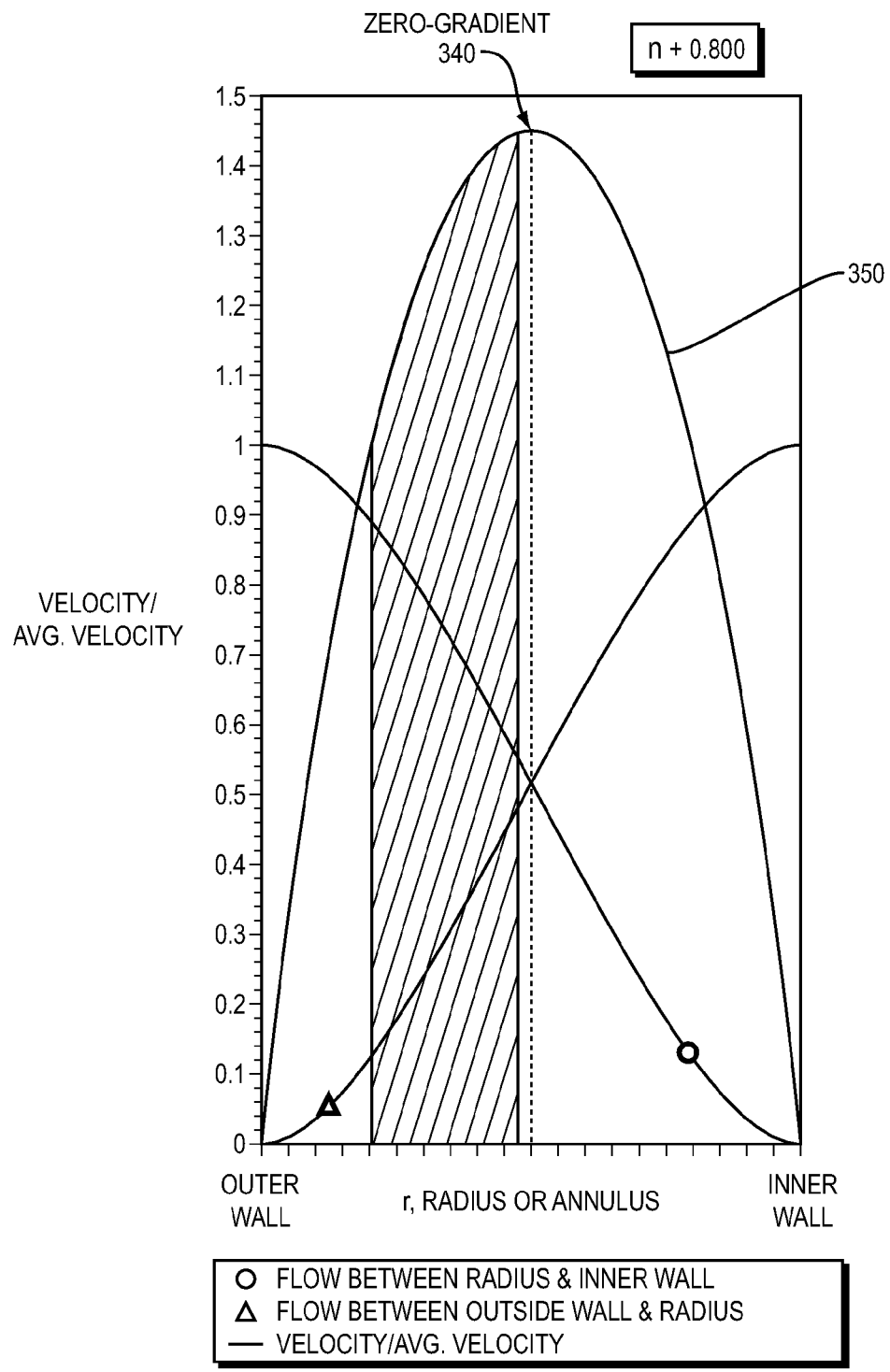
FIG. 7C is a graph illustrating resulting flow fraction and velocity profile curves across the annular channel within a nozzle such as in FIG. 4 or for an annular channel in a mold cavity.

FIG. 7C plots the ratio of flow velocity-to-average flow velocity as a function of the radius of the annulus between the inner and outer flow channel walls. FIG. 7C depicts the normalized velocity profile 350 and volume fraction inside and outside for a fluid with n=0.8 (where n is the parameter for the non-Newtonian power law model of fluid flow). The zero gradient 340 for the combined flow stream (CF) is marked on the normalized velocity profile 350. The curve designated with a circle marker plots the inner flow (IF) between the radius and the inner cylindrical wall T from the inner to the outer wall. The curve marked with a triangle plots the outer flow (OF) between the outer cylindrical wall and the annular radius. The hatched area shows the acceptable location for interior layer placement that is both greater than the average velocity and off the zero velocity gradient 340. The interior layer material placed within this area will wrap to the outside of the part. From the graph we can see that the flow fraction of the outside layer can be in a range from 0.1 to 0.45. The flow fraction of the inside layer can be from 0.9 to 0.55. The interior layer thickness can be as thick as about 25% of the thickness of the flowing layer which is about 35% of the flow fraction, 0.1 to 0.45. If the hatched area were on the opposite side of the zero velocity gradient 340, the flow fraction of the inside layer and outside layer would be of similar magnitude, but inversed, and the interior layer would then wrap toward the inside wall.

Exemplary embodiments have the foldover biased away from the heat-sealable surface when the adhesion between the closure and the container flange may be affected by the adhesion of the interior layer material, the inner layer material and/or the closure material to each other. Other embodiments may have the interior layer biased toward the heat-sealable zone when closure adhesion is not adversely affected by the proximity of the interior layer to the heat-sealable surface.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense.

What is claimed is:

1. A method of molding a multi-layer article from a first polymeric material and a second polymeric material, the method comprising:
   injecting the first polymeric material into a mold cavity configured to form a resulting multi-layer article having an open end opposed to a closed end and a flange disposed at the open end with the flange including a heat sealable zone of the resulting multi-layer article;
   injecting the second polymeric material into the mold cavity to form an inner layer and an outer layer of the resulting multi-layer article; and
   positioning the first polymeric material in the heat sealable zone of the resulting multi-layer article to maintain integrity of a resulting interior layer of the resulting multi-layer article during a heat sealing operation by co-injecting the first polymeric material along a flow streamline offset from a zero velocity gradient of a combined flow of the first and second polymeric materials.

2. A method as defined in claim 1, wherein the first polymeric material and the second polymeric material are different materials.

3. A method as defined in claim 1, wherein the first polymeric material forms an interior barrier layer or an interior scavenger layer in the resulting multi-layer article.

4. A method as defined in claim 1, wherein the first polymeric material is co-injected along a flow streamline biased toward a resulting outer wall surface of the resulting multi-layer article.

5. A method as defined in claim 1, wherein the first polymeric material is co-injected along a flow streamline biased toward a resulting inner wall surface of the resulting multi-layer article.

6. A method as defined in claim 1, further comprising heat-sealing a component to a surface portion of the heat sealable zone.

7. The method of claim 4, further comprising maintaining co-injection of the first polymeric material along a flow streamline offset from the zero velocity gradient of the combined flow and biased toward the resulting outer wall surface of the resulting multi-layer article throughout co-injection of the first polymeric material into the mold cavity.

8. The method of claim 7, wherein first polymeric material is co-injected along a flow streamline having a velocity greater than an average velocity of the combined flow throughout co-injection of the first polymeric material into the mold cavity.

9. The method of claim 5, further comprising maintaining co-injection of the first polymeric material along a flow streamline offset from the zero velocity gradient of the combined flow and biased toward the resulting inner wall surface of the resulting multi-layer article throughout co-injection of the first polymeric material into the mold cavity.

10. The method of claim 9, wherein first polymeric material is co-injected along a flow streamline having a velocity greater than an average velocity of the combined flow throughout co-injection of the first polymeric material into the mold cavity.

11. The method of claim 1, wherein the inner layer or the outer layer of the resulting multi-layer article has a sealing surface, and wherein the method further comprises co-injecting the first polymeric material along a flow streamline offset from a zero velocity gradient of a combined flow of the first and second polymeric materials and biased away from the layer of the resulting multi-layer article having the sealing surface.

12. The method of claim 11, further comprising maintaining co-injection of the first polymeric material along a flow streamline offset from the zero velocity gradient and biased away from the layer of the resulting multi-layer article having the sealing surface throughout co-injection of the first polymeric material into the mold cavity.

13. The method of claim 11, wherein first polymeric material is co-injected along a flow streamline having a velocity greater than an average velocity of the combined flow throughout co-injection of the first polymeric material into the mold cavity.

14. The method of claim 1, wherein the heat sealable zone of the resulting article includes a sealable surface substantially parallel to an orientation of a layer of first polymeric material in the heat sealable zone of the resulting article.

* * * * *